United States Patent
Shemesh et al.

(10) Patent No.: US 9,774,670 B2
(45) Date of Patent: Sep. 26, 2017

(54) METHODS FOR DETECTION OF CONTENT SERVERS AND CACHING POPULAR CONTENT THEREIN

(75) Inventors: Oren Shemesh, Moshav Moledet (IL); Yoav Gressel, Netaim (IL)

(73) Assignee: Qwilt, Inc., Redwood City, CA (US)

( * ) Notice: Subject to any disclaimer, the term of this patent is extended or adjusted under 35 U.S.C. 154(b) by 0 days.

(21) Appl. No.: 13/006,875

(22) Filed: Jan. 14, 2011

(65) Prior Publication Data

US 2012/0047224 A1    Feb. 23, 2012

Related U.S. Application Data

(63) Continuation of application No. 13/006,785, filed on Jan. 14, 2011.

(60) Provisional application No. 61/375,836, filed on Aug. 22, 2010, provisional application No. 61/375,838, filed on Aug. 22, 2010.

(51) Int. Cl.
*G06F 15/16* (2006.01)
*H04L 29/08* (2006.01)

(52) U.S. Cl.
CPC .... *H04L 67/1095* (2013.01); *H04L 29/08729* (2013.01)

(58) Field of Classification Search
CPC . H04L 69/22; H04L 65/4084; H04L 67/1014; H04L 67/2842; H04L 29/08729; G06F 17/30902
USPC ............... 709/223, 224, 217; 370/230, 352; 715/716; 725/92, 95
See application file for complete search history.

(56) References Cited

U.S. PATENT DOCUMENTS

| | | | |
|---|---|---|---|
| 5,933,603 A | 8/1999 | Vahalia et al. | |
| 6,049,530 A | * 4/2000 | Petersen et al. | ............... 370/248 |
| 6,363,413 B2 | 3/2002 | Kidder | |
| 6,700,889 B1 | 3/2004 | Nun | |
| 6,772,193 B1 | 8/2004 | Igawa et al. | |
| 6,831,893 B1 | 12/2004 | Nun et al. | |
| 6,873,600 B1 | 3/2005 | Duffield et al. | |
| 6,985,956 B2 | 1/2006 | Luke et al. | |
| 6,986,018 B2 | 1/2006 | O'Rourke et al. | |
| 7,281,260 B2 | 10/2007 | Puente et al. | |

(Continued)

OTHER PUBLICATIONS

Non-final Office Action dated Sep. 25, 2012 in U.S. Appl. No. 13/006,785.

(Continued)

*Primary Examiner* — Hitesh Patel
(74) *Attorney, Agent, or Firm* — M&B IP Analysts, LLC

(57) ABSTRACT

A method for identification of popular content provided over a first portion of a network to a second portion of a network in the form of packets containing, the method comprises identifying a source of content in the first portion of a network. Deep-packet-inspection (DPI) is performed to determine if content in each packet related to the content is to be stored in a storage that is in a path between the content source and at least a user node in the second portion of the network. The content is stored. A request is received from the user node for a requested content. It is determined if the requested content or portions of the requested content is in the storage. if the requested content or portions of the requested content is missing in the storage, a request is sent to the content source for the requested content or missing portions of the requested content.

17 Claims, 4 Drawing Sheets

(56) References Cited

U.S. PATENT DOCUMENTS

| | | |
|---|---|---|
| 7,310,480 B2 | 12/2007 | Maciocco et al. |
| 7,349,979 B1 | 3/2008 | Cieslak et al. |
| 7,436,830 B2 | 10/2008 | Ben-Nun et al. |
| 7,606,314 B2 | 10/2009 | Coleman et al. |
| 7,719,966 B2 | 5/2010 | Luft et al. |
| 7,912,921 B2 | 3/2011 | O'Rourke et al. |
| 7,957,396 B1* | 6/2011 | Kohn et al. ............ 370/395.32 |
| 8,009,682 B2 | 8/2011 | Gopinath et al. |
| 8,065,559 B2 | 11/2011 | Kamath et al. |
| 8,621,101 B1 | 12/2013 | Starr et al. |
| 8,737,407 B2 | 5/2014 | Shetty et al. |
| 8,937,942 B1 | 1/2015 | Li et al. |
| 2002/0006124 A1* | 1/2002 | Jimenez et al. ............ 370/352 |
| 2002/0062372 A1* | 5/2002 | Hong .................. H04L 29/06 709/225 |
| 2004/0128693 A1 | 7/2004 | Weigand |
| 2005/0022237 A1 | 1/2005 | Nomura |
| 2006/0129697 A1* | 6/2006 | Vange et al. ................ 709/245 |
| 2006/0271972 A1* | 11/2006 | Pai et al. ...................... 725/86 |
| 2007/0124781 A1 | 5/2007 | Casey et al. |
| 2009/0083279 A1 | 3/2009 | Hasek |
| 2009/0307757 A1 | 12/2009 | Groten |
| 2009/0313437 A1 | 12/2009 | Sofman et al. |
| 2010/0023726 A1 | 1/2010 | Aviles |
| 2010/0054257 A1 | 3/2010 | Dolganow et al. |
| 2010/0082774 A1 | 4/2010 | Pitts |
| 2010/0115072 A1* | 5/2010 | Payyappilly et al. ........ 709/222 |
| 2010/0287227 A1 | 11/2010 | Goel et al. |
| 2011/0055386 A1 | 3/2011 | Middleton et al. |
| 2011/0141887 A1* | 6/2011 | Klein et al. .................. 370/230 |
| 2011/0153937 A1* | 6/2011 | Annamalaisami et al. .. 711/118 |
| 2012/0011271 A1 | 1/2012 | Zhao et al. |
| 2012/0030212 A1* | 2/2012 | Koopmans et al. .......... 707/741 |
| 2012/0047224 A1 | 2/2012 | Shemesh et al. |
| 2012/0047252 A1 | 2/2012 | Maor et al. |
| 2012/0159329 A1* | 6/2012 | Chow .................. G11B 27/329 715/716 |
| 2012/0159558 A1* | 6/2012 | Whyte ................ H04N 21/222 725/95 |
| 2014/0108586 A1 | 4/2014 | Zhao |
| 2016/0021057 A1 | 1/2016 | Frost et al. |

OTHER PUBLICATIONS

Non-Final Office Action dated Jul. 26, 2012 in U.S. Appl. No. 13/006,875.

* cited by examiner

METHODS FOR DETECTION OF CONTENT SERVERS AND CACHING POPULAR CONTENT THEREIN

The present application is a continuation of concurrently filed patent application entitled "A System for Detection of Content Servers and Caching Popular Content Therein", and further claims priority from priority from U.S. provisional patent application 61/375,836, entitled "A System for Detection of Content Servers and Caching Popular Content Therein", filed on 22 Aug. 2010, and U.S. provisional patent application 61/375,838, entitled "Methods for Detection of Content Servers and Caching Popular Content Therein", filed on 22 Aug. 2010, both assigned to common assignee and hereby incorporated by reference for all that they contain.

TECHNICAL FIELD

The invention generally relates to classification of packets transmitted in a network and more specifically to the determination of content to be stored in storage located along the network based on the type of data transferred in the packet.

BACKGROUND

Service providers worldwide are facing a mounting problem of flattening revenues coupled with increasing costs brought forth by increasing usage of bandwidth, growing churn, subscriber saturation and competitive price pressures. These mobile and broadband providers are facing challenges in delivering new revenue generating services while seeing their (over the top) OTT counterparts reaping rewards with content delivered over the networks they built and maintained over the years.

The vast majority of these OTT services are delivered over hypertext transfer protocol (HTTP), the de-facto protocol for application development and delivery. Be it video, social networking, search, or advertising, over fixed line as well as mobile applications, it is most likely running on top of HTTP. However, this protocol is also the most processing intensive protocol for network devices. Hence practically any increase in usage results in increase the pressure on the service providers.

Certainly one way to control traffic on the Internet requires various levels of understanding of the traffic that flows through the network which is also increasing in its level of sophistication. Various systems and solutions have been offered to enable deep-packet-inspection (DPI) to enable an ever sophisticated ability to shape the traffic on the network. This ability allows the service providers to better manage the network and its related resources, provide a higher level of quality of service (QoS) in the hopes to increase revenues and profits. However, the rapid increase in the delivery of heavy bandwidth consuming data, such as video, and consumption thereof, requires a new level of handling that is not available today in prior art solutions. A known problem is the access of a user node to a content source and subsequently the access by another user node to the same content, resulting in additional load on the content provider and on the entire network. When, for example, popular video clips are accessed there is a significant and noticeable degradation of the network performance that may even lead to a network failure. Some prior art solutions attempt to store all the data in caches, however, with the huge amounts of data and the need to inspect each and every packet, regardless of its source, makes this a daunting and impractical task.

It would be advantageous to provide service providers with a solution that will enable them to effectively manage and control the delivery of heavy bandwidth consuming data such that the overall bandwidth requirements are loaded and better shared across the network in general, and in particular within the network of a specific service provider.

SUMMARY

To realize some of the advantages described above, there is provided a method for identification of popular content provided over a first portion of a network to a second portion of a network in the form of packets containing, the method comprises identifying a source of content in the first portion of a network. Deep-packet-inspection (DPI) is performed to determine if content in each packet related to the content is to be stored in a storage that is in a path between the content source and at least a user node in the second portion of the network. The content is stored. A request is received from the user node for a requested content. It is determined if the requested content or portions of the requested content is in the storage. if the requested content or portions of the requested content is missing in the storage, a request is sent to the content source for the requested content or missing portions of the requested content.

Specifically, the content is stored in the storage based on at least popularity of the content.

More specifically, the technique includes determination of the at least a content source as a source from which content is to be saved in the storage.

More specifically, the determination of the at least a content source is based on the popularity of access to the content in the at least a content source.

More specifically, the DPI is performed on a predefined portion of packets flows from packet traffic on the first portion of the network.

More specifically, the predefined portion is determined by using a hash function that accepts as an input source, addresses and destination addresses of the packet flows.

More specifically, the hash function further accepts as an input source ports and destination ports of packet flows.

More specifically, upon determination that a content source of the at least a content source contains content of interest than at least inspecting all packets of such content source.

More specifically, the content is video content.

Another aspect of the disclosed teachings is a method for delivering popular content responsive of a request by at least a user node from a storage located on a network path between the at least a user node in a second portion of the network and at least a content source in a first portion of the network, the method comprising performing deep-packet-inspection (DPI) of packets containing content delivered over the network path and storing in a storage, content determined to be popular content.

More specifically, a source of the at least a content source providing content determined to be popular content is identified as a content source for which all packets are inspected for popular content.

Another aspect of the disclosed teachings is a method comprising receiving at least a parameter regarding data type of a content. Data packets are selected for inspection from a plurality of data packets transferring over a first portion of a network. Deep-packet-inspection (DPI) is performed on the selected data packets to determine based on the at least parameter if the data packets contain content of interest. An identification counter respective of the data packets that contain content of interest is increased. A count of the identification counter is associated with a content source. DPI is performed on each packet of the plurality of data packets that comes from an identified source. Content of the inspected each packet is stored if the inspection determined that the content was a content of interest More specifically, the selecting data packets for inspection comprises selecting one out of a predefined portion of packets of packet flows from the traffic on a network.

More specifically, determining the predefined portion comprises using a hash function that accepts as an input the source address and destination address of packets.

More specifically, a source of content is considered to be identified upon an identification count exceeding a predetermined threshold value.

More specifically, the value of the identification counter is decreased if the count did not increase for a predefined period of time.

More specifically, storing content occurs after inspection of the content of a received data packet from the second network by the DPI unit.

BRIEF DESCRIPTION OF THE DRAWINGS

The above discussed advantages of the disclosed teachings will become more apparent by describing in detail some exemplary implementations thereof with reference to the attached drawings in which.

DETAILED DESCRIPTION

Techniques are used in conjunction with a 'bump-in-the-wire' apparatus for efficient usage of network bandwidth. Specifically, the system samples packets from a plurality of content sources and identifies those content sources providing predetermined types of data, for example, video clips. Upon identification of such content sources, any data that arrives from such a content source is subject to a deep-packet-inspection (DPI) process to positively identify the content and the need to store it in cache storage such that when a subsequent request for the same content is received there is no need to transmit the content from the content source and rather deliver it from the system's storage. This results in at least less traffic flowing in entire network, faster service, and lower operational costs.

Figure 1:
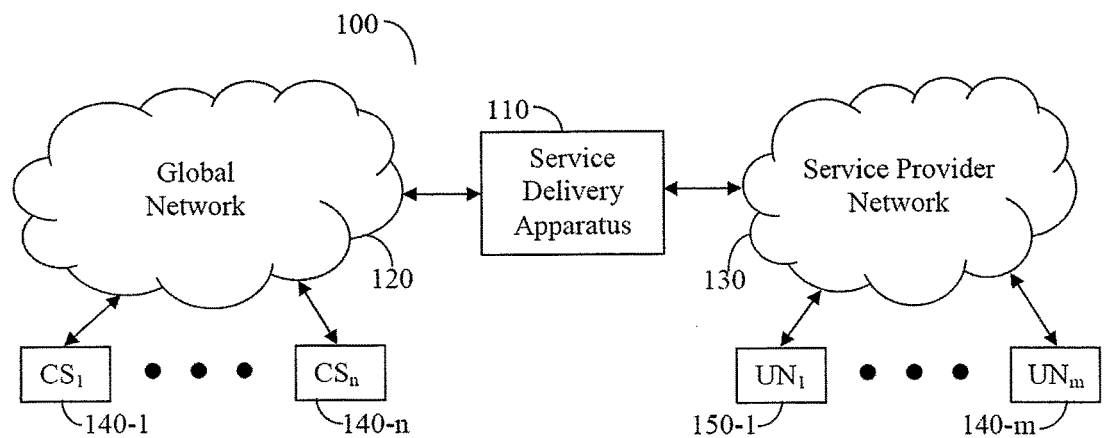
FIG. 1 is a block diagram depicting an exemplary network system in accordance with aspects of the disclosed teachings.

Reference is now made to FIG. 1 where an exemplary and non-limiting block diagram 100 of a basic network system in accordance with the disclosed teachings is shown. The system depicted comprises a first portion of a network and a second portion of the network. In this example, the first portion of the network is a global network 120 and the second portion of the network is a service provider network 130. The first and the second portion of the network are coupled by a 'bump-in-the-wire' apparatus 110. While the network 120 and 130 are shown as detached from each other it should be noted that this is only an exemplary configuration and other configurations are possible without departing from the principles of the invention and such separation may be, for example, merely a logical separation. To the global network 120, there are connected one or more content sources (CSs), shown as $CS_1$ 140-1 through $CS_n$ 140-n, commonly referred to as CS 140. The content sources provide content upon request, for example video clips, from the appropriate CS to a requestor. To the service provider network 130 there are connected one or more user nodes (UNs), shown as $UN_1$ 150-1 through $UN_m$ 150-m, commonly referred to as UN 150. When a UN 150 requests content from a CS 140 it is transferred, according to the invention through a service deliver apparatus (SDA) 110, the function of which is described in more detail herein below. Generally, the SDA 110 may provide the requested content from its storage or, when such content, or portions thereof, are not in the SDA 110, then the request is forwarded to the appropriate CS 140 for the delivery of the content, and as further described below.

Figure 2:
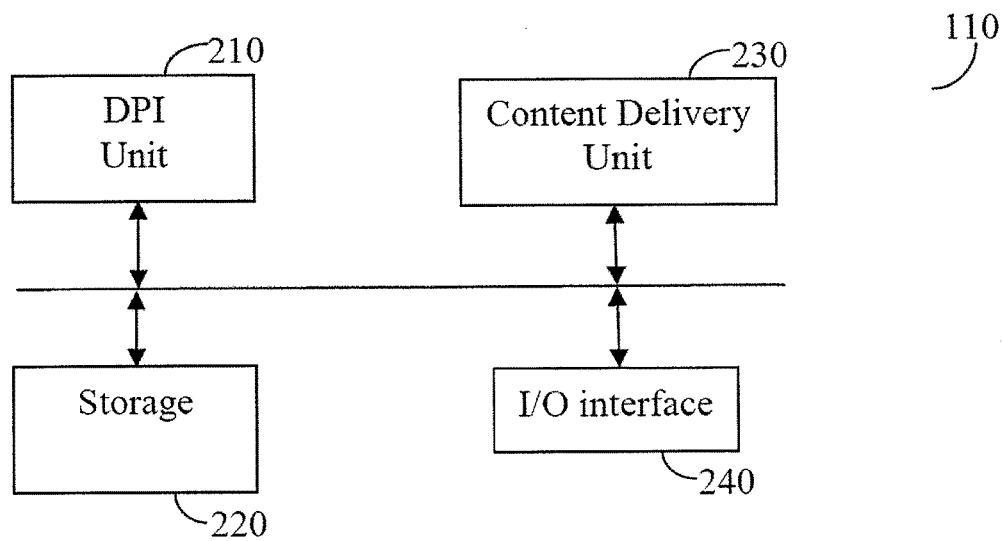
FIG. 2 is a block diagram depicting an exemplary implementation of an apparatus to identify content sources and provide content from the apparatus in accordance aspects of the disclosed teachings.

FIG. 2 provides an exemplary and non-limiting block diagram of the SDA 110 that identifies content sources and provides content from the apparatus in accordance with the disclosed teachings. The SDA 110 comprises a DPI unit 210, a storage 220, a content delivery unit (CDU) 230 and an input/output interface 240. According to the disclosed teachings, the DPI unit 210 has two separate tasks. The first task is to identify sources of content that potentially contain data that may be worthwhile to store in storage 220. For example, video servers may be located throughout the global network 120 and accessed by UNs 150 of the service provider network 130, randomly by UNs 150. In order to overcome the deficiencies of related art solutions the apparatus 110 is implemented differently. The DPI unit 210 is provided with data types to look for in data packets that are transmitted through the apparatus 110. Instead of inspecting each and every packet DPI unit 210 may inspect only one in a certain number of (for example, one-in-a-thousand packets) out of the entire traffic thereby significantly lowering the processing load. It should be understood that the method for selecting the sampled packets is typically not performed by using a simple counter to process one out of every predetermined number of packets. Instead the source and destination addresses from each packet are fed into a hash function, and the hash function result is compared to a configurable threshold, and the result of this comparison determines if the packet is inspected or not. In addition, it should be understood that the hash function is symmetric with respect to the source/destination addresses, such that swapping the source address and the destination address does not change the hash result. In one embodiment of the invention source/destination ports may also be used as part of the hash function operation. This is needed to guarantee that each flow comprising of multiple packets sent between a UN 150 and a CS 140 is either fully ignored or fully inspected. Upon determination that a specific CS 140 provides a desired data type, the identification of that CS 140 is stored. Any future packet received from or sent to the identified CS 140 is inspected by the DPI unit 210 and if the packet contains content that may be interesting for storage, such as video content, such content is stored in the storage 220. This kind of inspection ensures that demand for highly popular content from a popular CS 140 is likely to be quickly detected while infrequent access to a CS 140 would typically not impact the traditional operation of the system. It should be noted that identification of a CS 140 does not have to be on the first detection of data of interest and threshold levels may be used, as well as an aging mechanism so that relatively infrequently accessed CSs 140 would lose older accesses from impacting a threshold value.

While DPI unit 210 operates on the packets that arrive from CSs 140, the CDU 230 operates with respect of requests for content received from the UNs 150 of the service provider network 130. Upon receipt of such a request, the DI 210 first checks if content from the requested CS 140 actually resides in the storage 220 by first checking that the CS 140 identification is known to the apparatus 110. If that is the case then the storage 220 is checked for the possibility of delivery of the content or portions thereof. If the entire content or portions thereof are found, then these are delivered to the requesting UN 150. If the entire content is missing, or certain portions thereof are missing, then the request is forwarded to the appropriate CS 140. Storage 220 may be semiconductor media, magnetic media, or any other type of storage media appropriate for the storage of content.

Figure 3:
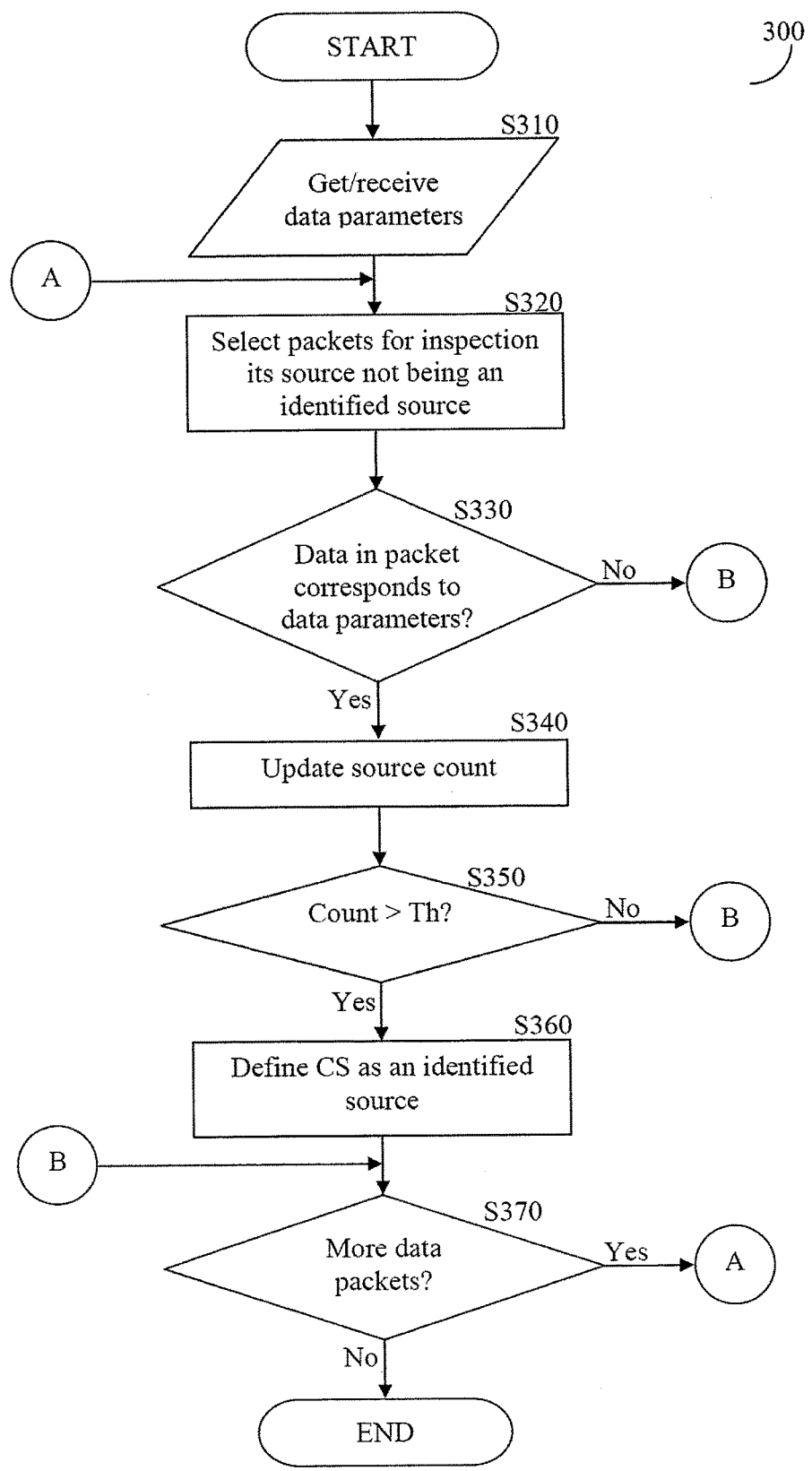
FIG. 3 is an exemplary flowchart depicting the identification of a content source in accordance with aspects of the disclosed teachings.

Reference is now made to FIG. 3 that depicts an exemplary and non-limiting flowchart 300 depicting the identification of a content source in accordance with aspects of the disclosed teachings. In S310 there are received and/or fetched parameters relating to the data of interest in the CSs. For example, it may contain parameters pertaining to video data. In S320, packets are selected off of the network traffic, for example the global network 120. The ratio between the number of packets that pass through the network and the number inspected may be configured, so it could be one-in-a-thousand, one-in-ten-thousand, and so on and so forth. In S330, it is checked if the data in the packet corresponds to the data parameters, e.g., contains video data, and if so execution continues with S340; otherwise, execution continues with S370. In S340, the count with respect to the CS 140 that is the source of the packet is updated, for example but not by way of limitation, by incrementing the value of a counter. In S350, it is checked if the count for that CS 140 has exceeded a threshold value and if so execution continues with S360; otherwise, execution continues with S370. In one implementation, the count may also have an aging mechanism (not shown). Furthermore, different data types may have different thresholds, different count increases, and different count aging. In S360 the CS 140 is identified as a source of content eligible for storage in storage, for example, storage 220. In S370, it is checked if there are more data packets to be inspected and if so, execution continues with S320; otherwise execution terminates.

Figure 4:
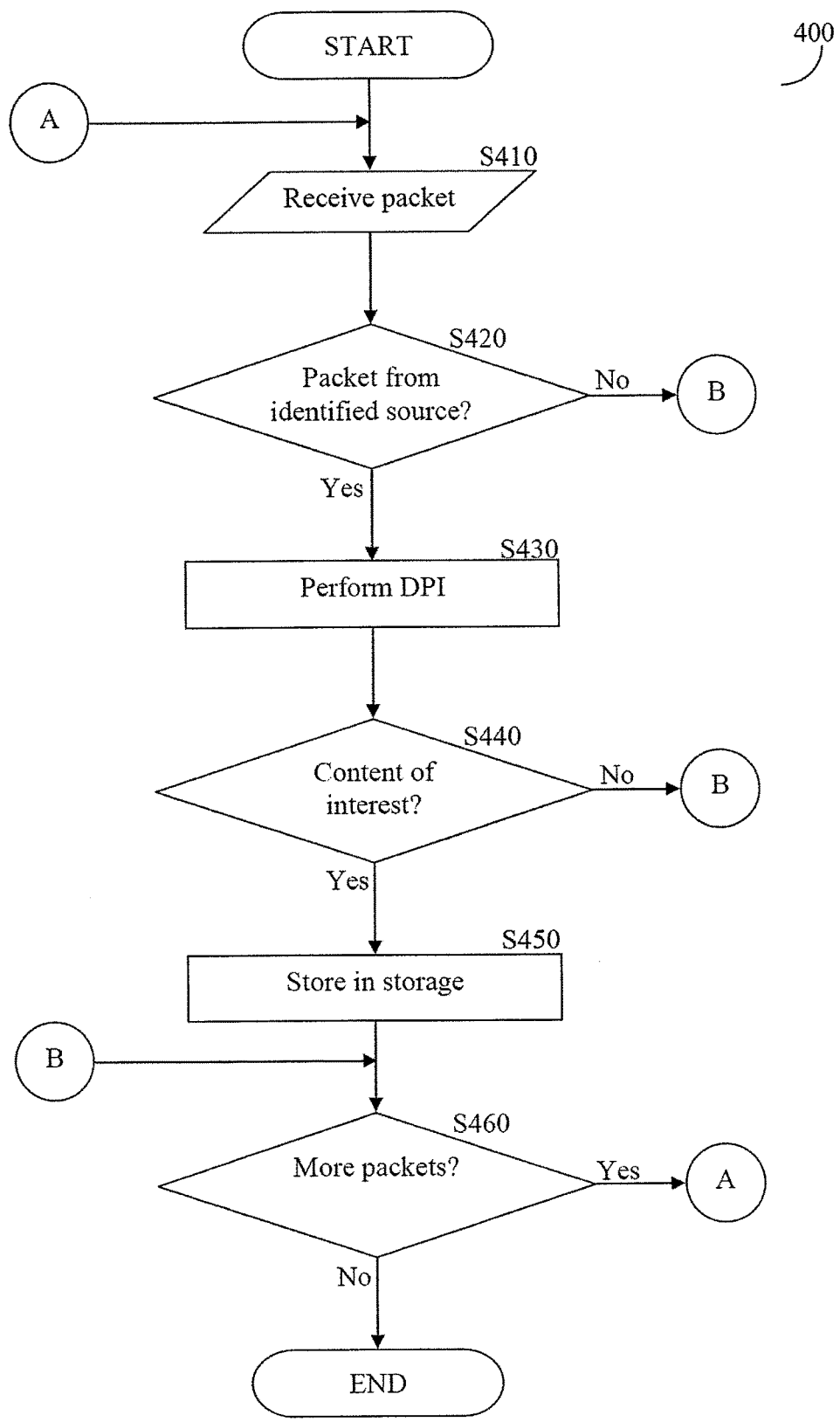
FIG. 4 is an exemplary flowchart depicting the storage of content from identified content sources in the storage of the apparatus according to aspects of the disclosed teachings.

Reference is now made to FIG. 4 that depicts an exemplary and non-limiting flowchart 400 depicting the storage of content from identified CS 140 in the storage 220 of the apparatus 110 according to aspects of the disclosed teachings. In S410, a packet is received by apparatus 110. In S420, it is checked whether the received packet is from an identified CS 140 and if so execution continues with S430; otherwise execution continues with S460. In S430, the received packet is inspected by the DPI unit 210 to identify content of interest. It should be understood that this takes place as it is possible that even though the packet arrived from an identified CS 140 it does not contain content of interest and therefore there is no need to waste valuable storage space in storage 220 for that data. In S440, it is checked whether such content of interest was found and if so execution continues with S450; otherwise, execution continues with S460. In S450 the content from the received packet is stored in storage, for example, storage 220. In S460 it is checked whether more packets are received and if so execution continues with S410; otherwise, execution terminates.

Figure 5:
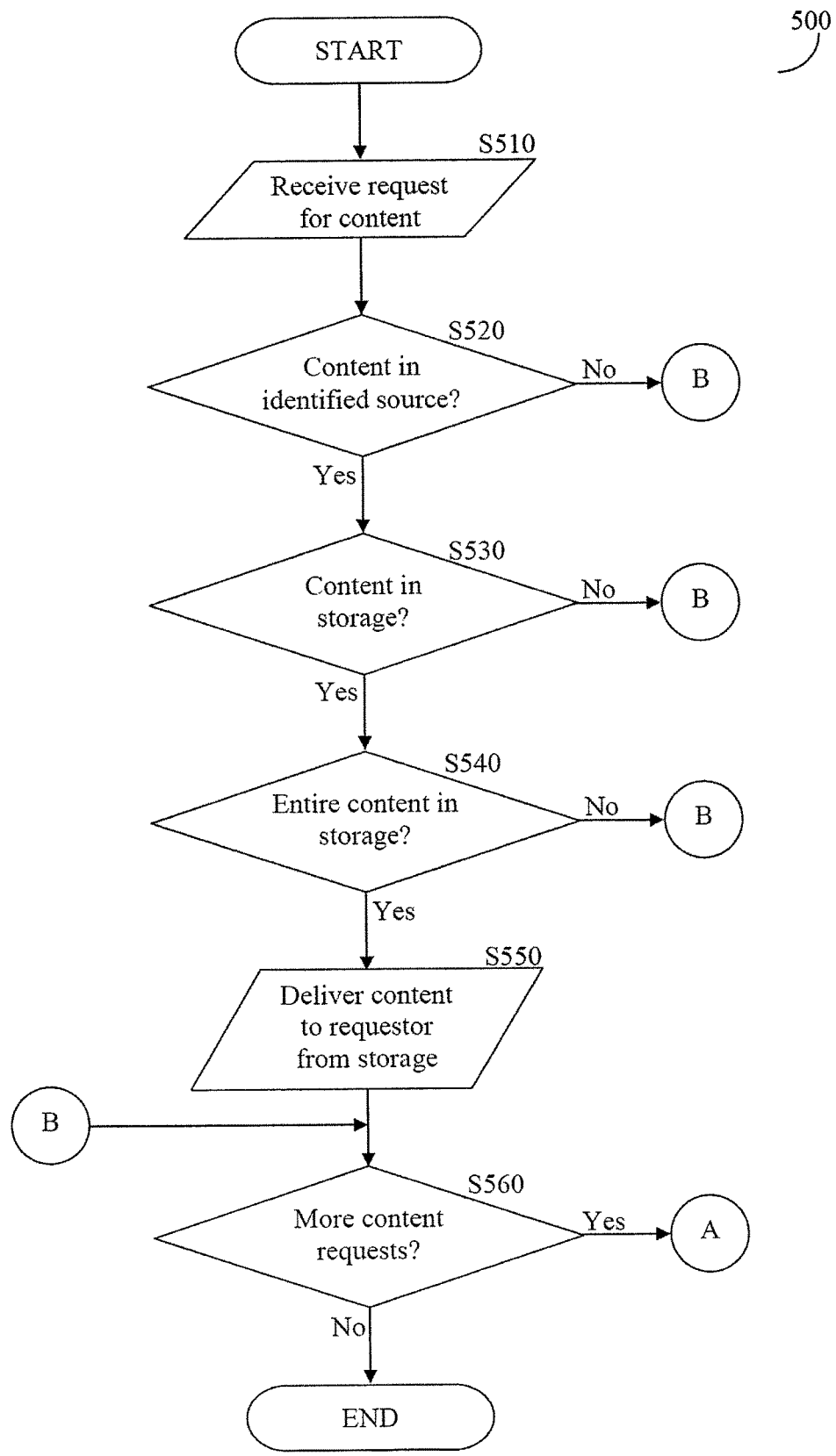
FIG. 5 is an exemplary flowchart describing the providing of content to a requesting node according to aspects of the disclosed teachings.

Reference is now made to FIG. 5 that depicts an exemplary and non-limiting flowchart 500 describing the providing of content to a requesting UN 150 according to aspects of the disclosed teachings. In S510, the apparatus 110 receives a request for content from a UN 150. In S520, it is checked if the requested content is in an indentified CS 140 and if so execution continues with S530; otherwise, execution continues with S560. In S530, it is checked whether the content is in storage, for example storage 220, and if so execution continues with S540; otherwise, execution continues with S560. In S540 it is checked whether the entire requested content is in storage and if so execution continues from S550; otherwise, execution continues with S560. In S550, the content is delivered to the requesting UN 150. In S560, it is checked whether additional content requests exist and if so execution continues with S510; otherwise, execution terminates.

In one alternate implementation, when detecting that a portion of the requested content is in the storage 220 and deliverable to the requesting UN 150, such content is delivered immediately to the UN 150 while only the missing portions of the content is requested from the CS 140. Hence a request from the CDU 230 may be for the requested content or portions thereof. It should be further understood that in a typical implementation, once the DPI unit 210 determines that a CS 140 may contain content that should be stored in storage 220, the packets from such a CS 140 are consistently inspected for determination of popular content.

The principles of the invention are implemented as hardware, firmware, software, or any combination thereof. Moreover, the software is preferably implemented as an application program tangibly embodied on a program storage unit or non-transitory computer readable medium or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A caching method performed at a node that is at least logically located between a first network and a second network, the method being for providing popular content by an identified source over the first network to the second network, the popular content being provided as packets each containing at least a portion of the popular content, the method comprising:
identifying by a deep-packet-inspection (DPI) unit for each packet received at the node a source of content from a plurality of sources of content to provide the content specified in the packet, the identified source communicatively connected to the first network and configured to provide the content over at least the first network;
performing by the DPI unit a DPI of packets transferred between the first network and the second network to determine if an inspected packet received from the identified source of content contains at least a portion of a popular content, the packets being directed from the identified source to at least one user node communicatively connected to the second network;
storing the portion of content determined to be popular content in a storage unit communicatively accessible from the first network for storage and the second network for retrieval;
receiving a request for a content portion from the identified source;
determining if the requested content portion is in the storage unit; and
sending a request to the identified source for the requested content portion when the requested content portion is not available in the storage unit;
wherein content is determined to be popular content for the node and storable therein when it is a type of content that has been indicated to be of interest for the node and is from a particular content source for which multiple requests for content of interest for the node have been received at the node within a specified period; and
wherein the DPI is performed on selected packets from a packet traffic on the first network, the selection being based on a configuration of the DPI unit of a symmetrical hash function to accept as an input at least a source address and at least a destination address of packets of the packet traffic, such that not all packets passing over the first network are inspected.

2. The caching method of claim 1, wherein the popular content portion is stored in the storage unit based on at least popularity of the popular content.

3. The caching method of claim 1, further comprising determining that the identified source is a source from which content may be saved in the storage unit.

4. The caching method of claim 2, wherein the determination of the identified source is based on the popularity of access to the popular content in the identified source.

5. The caching method of claim 1, wherein the selection is further based on a configuration of the DPI unit to establish a ratio between a number of selected packets and a number of packets passing over the first networks.

6. The caching method of claim 1, wherein the symmetrical hash function of the DPI unit further accepts as an input at least a source port and at least a destination port of packets of the packet traffic.

7. The caching method of claim 5, wherein upon the identification of the identified source of content inspecting all packets from the identified source of content provided on the first network.

8. The caching method of claim 1, wherein the popular content is a video content.

9. A caching method for delivering popular content in response to a request received at at least one user node that is communicatively coupled to a second network from a storage unit located on a network path between the at least one user node and an at least one source of popular content communicatively coupled to a first network, the storage unit being accessible from both the first network and the second network, the method comprising:
identifying the at least one source of popular content by a deep-packet inspection (DPI) unit, the DPI unit configured for identification of the at least one source of popular content;
performing a DPI by the DPI unit of packets containing content carried over the network path and storing in the storage unit content determined to be popular content and provided by the identified at least one source of popular content;
wherein content is determined to be popular content for the node and storable therein when it is a type of content that has been indicated to be of interest for the node and multiple requests for content of interest for the node from the identified at least one source have been received at the node within a specified period; and
wherein the DPI is performed on selected packets from a packet traffic on the first network, the selection of packets for DPI being based on a configuration of the DPI unit of a symmetrical hash function to accept as an input at least a source address and at least a destination address of packets of the packet traffic, such that not all packets passing over the first network are inspected.

10. The caching method of claim 9, wherein the popular content is video content.

11. The caching method of claim 9, further comprising:
performing a DPI by the DPI unit on all packets from the identified at least one source of popular content.

12. A caching method performed at a node that is at least logically located between a first network and a second network, comprising:
receiving at least one parameter regarding a data type of a content;
selecting packets at the node from a plurality of packets transferring over the first network for inspection by a deep-packet inspection (DPI) unit configured to use a symmetric hash function that accepts as an input at least a source address and at least a destination address of a packet being inspected such that not all packets passing over the first network are selected for inspection;
performing a DPI on the selected packets to determine based on the at least one parameter if the selected packets contain content of interest;
increasing a numerical value of an identification counter based on a determination that inspected selected packets contain content of interest;
associating the identification counter with a content source;
performing a DPI by the DPI unit on each packet of a plurality of packets that comes from the associated content source; and storing content of the inspected each packet if the inspection by the DPI unit determined that the content is a content of interest;

wherein content is determined to be of interest for the node and storable therein when it is from a particular content source and for which multiple requests for such content have been received at the node within a specified period.

13. The caching method of claim 12, wherein the selecting of packets from a plurality of packets for inspection comprises:

configuring the DPI unit to establish a ratio between a number of packets selected for inspection and a total number of packets on a network, such that not all packets passing over the network are inspected.

14. The caching method of claim 12, wherein a source of content is considered to be identified upon an identification count exceeding a predetermined threshold value.

15. The caching method of claim 12, further comprises:

decreasing the numerical value of the identification counter if the count did not increase for a predefined period of time.

16. The caching method of claim 12, wherein the content is video.

17. The caching method of claim 12, wherein storing content occurs after inspection of the content of a received data packet by the DPI unit.

\* \* \* \* \*